(12) United States Patent
Xie

(10) Patent No.: US 12,496,675 B1
(45) Date of Patent: Dec. 16, 2025

(54) TOOL CLAMPING ASSEMBLY AND SHARPENER

(71) Applicant: Tirui Xie, Chongqing (CN)

(72) Inventor: Tirui Xie, Chongqing (CN)

( * ) Notice: Subject to any disclaimer, the term of this patent is extended or adjusted under 35 U.S.C. 154(b) by 0 days.

(21) Appl. No.: 18/937,192

(22) Filed: Nov. 5, 2024

(30) Foreign Application Priority Data

Oct. 29, 2024 (CN) .......................... 202411521630.3
Oct. 29, 2024 (CN) .......................... 202422623427.9

(51) Int. Cl.
| | |
|---|---|
| *B24B 3/54* | (2006.01) |
| *B24D 15/06* | (2006.01) |
| *B24D 15/08* | (2006.01) |
| *B24D 15/10* | (2006.01) |
| *B25B 5/04* | (2006.01) |
| *B25B 5/10* | (2006.01) |

(52) U.S. Cl.
CPC ................ *B24B 3/54* (2013.01); *B24D 15/06* (2013.01); *B24D 15/065* (2013.01); *B24D 15/085* (2013.01); *B24D 15/105* (2013.01); *B25B 5/04* (2013.01); *B25B 5/103* (2013.01)

(58) Field of Classification Search
CPC ......... B24D 15/08; B24B 41/066; B24B 3/54; B24B 3/543; B25B 5/04; B25B 13/30; B25B 13/32
USPC ................... 451/321, 371; 269/217, 219, 237
See application file for complete search history.

(56) References Cited

U.S. PATENT DOCUMENTS

| | | | | |
|---|---|---|---|---|
| 11,052,512 B1 * | 7/2021 | Allison | ................... | B24B 3/543 |
| 2022/0331926 A1 * | 10/2022 | Allison | ................... | B24B 3/543 |

* cited by examiner

*Primary Examiner* — Makena S Markman
(74) *Attorney, Agent, or Firm* — JEEN IP LAW, LLC

(57) ABSTRACT

A tool clamping assembly and a sharpener are provided. The tool clamping assembly includes an arm body, its first end is connected with a sharpening frame, the arm body is provided with a top pin and a driving member, the driving member drives the top pin to move along an axial direction of the arm body; a clamping arm component, which includes a first clamping arm and a second clamping arm, the two clamping arms are mirror symmetric and are connected by a rotation axis. The rotation axis is connected to a second end of the arm body, and a torque member is provided on the rotation axis. The torque member is used to apply torque to the two clamping arms to jointly clamp the top pin at first ends of the two clamping arms; when the top pin is moved, the two clamping arms can be rotated synchronously.

9 Claims, 8 Drawing Sheets

TOOL CLAMPING ASSEMBLY AND SHARPENER

CROSS-REFERENCE TO RELATED APPLICATIONS

This application claims priority to Chinese Patent Application No. 202411521630.3, filed on Oct. 29, 2024, and Chinese Patent Application No. 202422623427.9, filed on Oct. 29, 2024. Both of which are hereby incorporated by reference in their entireties.

TECHNICAL FIELD

The present disclosure relates to the field of kitchen utensils technologies, and in particular, to a tool clamping assembly and a sharpener.

BACKGROUND

The tool holder design on traditional sharpeners includes two locking ways, one is a single-sided locking and the other is a double-sided locking. The biggest problem with the single-sided locking is that it cannot guarantee the stability of a double-sided angle of the tool. It requires frequent disassembly of the clamped tool with a wrench tool to achieve angle stability. A grinding process requires disassembly dozens of times to ensure that the double-sided angle of the tool is consistent, which is very cumbersome; the double-sided locking can ensure stable double-sided angle, but requires the use of an internal hexagonal wrench to lock and clamp the tool, which has a function of flipping on two sides. However, the internal hexagonal wrench is cumbersome to operate, and women have less force, which can easily cause a pin hole to slip, rendering it not durable, short service life, labor-intensive, and very unfriendly to women.

SUMMARY

In view of the above-mentioned problems in the existing technology, the purpose of the embodiment of the present disclosure is to provide a tool clamping assembly and a sharpener. Compared to traditional clamping components, this tool clamping assembly eliminates a need for frequent use of a hexagonal wrench and shortens the clamping and disassembly time of the tool.

The technical solution adopted in the embodiments of the present disclosure is as following.

A tool clamping assembly used for a sharpener, where the sharpener is provided with a sharpening frame, and the tool clamping assembly includes:
  an arm body, a first end of the arm body is connected with the sharpening frame, and the arm body is provided with a top pin and a driving member, the driving member is configured to drive the top pin to move along an axial direction of the arm body;
  a clamping arm component, including a first clamping arm and a second clamping arm, the first clamping arm and the second clamping arm are mirror symmetric and are connected by a rotation axis, the rotation axis is connected to a second end of the arm body, the rotation axis is provided with a torque member configured to apply torque to the two clamping arms to jointly clamp the top pin at a first end of the first clamping arm and a first end of the second clamping arm, where the torque member is a torsion spring;
  when the top pin is moved, the first clamping arm and the second clamping arm are rotated synchronously, so that a second end of the first clamping arm and a second end of the second clamping arm are closed to each other to clamp the tool or separate from each other to release the tool.

In some embodiments of the present disclosure, a shape of the top pin is a trapezoidal block, and a first side wall surface and a second side wall surface of the top pin are mirror symmetric about a symmetry plane between the first clamping arm and the second clamping arm;
  the first side wall surface of the top pin abuts against the first end of the first clamping arm, and the second side wall surface of the top pin abuts against the first end of the second clamping arm.

In some embodiments of the present disclosure, the driving member is a driving nut, which is located on one side of the top pin away from the rotation axis and abuts against the top pin; the driving nut is threaded with the arm body, and the driving nut is capable of being rotated relative to the arm body to drive the top pin to be close to the rotation axis.

In some embodiments of the present disclosure, the arm body includes a first arm body, a second arm body, and a rotating sleeve;
  the first end of the first arm body is connected with the sharpening frame, the first end of the second arm body is connected to the top pin, and the rotating sleeve is fixedly connected to the second end of one of the two arm bodies and threaded to the second end of the other arm body;
  the top pin and the driving member are respectively located on the second arm body.

In some embodiments of the present disclosure, the tool clamping assembly further includes a rotating joint, where the rotating joint is connected to the first end of the arm body and the sharpening frame, and the rotating joint causes the arm body to swing relative to the sharpening frame.

A sharpener, including:
  a sharpening stand, configured to fix a sharpening stone;
  a sharpening frame, provided on the sharpening stand, where the sharpening frame is capable of moving relative to the sharpening stand; and
  the tool clamping assembly, which is connected to the sharpening frame and capable of moving with the sharpening frame to grind a tool through the sharpening stone.

In some embodiments of the present disclosure, a first guide member is provided on one side of the sharpening stand facing away from the sharpening stone;
  the sharpener further includes a sliding seat, where a second guide member is provided on the sliding seat, and the first guide member and the second guide member can cooperate with each other to enable the sliding seat to slide relative to the sharpening stand;
  the sharpening frame is connected to the sliding seat and is capable of being slid with the sliding seat.

In some embodiments of the present disclosure, the sharpener frame includes a first side bracket and a second side bracket that are spaced apart, and a crossbar connecting the first side bracket and the second side bracket;
  the crossbar is located above the sharpening stand, and the first end of the arm body is connected to the crossbar;
  the first side bracket is located on a first side of the sharpening stand, and the second side bracket is located on a second side of the sharpening stand; the first side bracket and the second side bracket are respectively rotatably connected to the sharpening stand; a fastening mechanism is provided between the first side bracket and the second side bracket with the sharpening stand, the fastening mechanism is configured to fix the sharpening stand to limit its rotation.

In some embodiments of the present disclosure, the fastening mechanism includes:

an arc-shaped guide groove, which is provided on the first side bracket and/or the second side bracket; an extension direction of the arc-shaped guide groove is consistent with a rotation direction of the first side bracket/ or a rotation direction of the second side bracket;

a screw hole, provided on the sliding seat and opposite to the arc-shaped guide groove;

tightening screws, which are respectively penetrated the arc-shaped guide groove and the screw hole, and the tightening screws are rotated to fix the sharpening stand.

In some embodiments of the present disclosure, the sharpener further includes a first movable plate and a second movable plate, where the first movable plate and the second movable plate are respectively connected to the sharpening stand, and the two movable plates are capable of being moving relative to the sharpening stand to separate from each other and fix the sharpening stand on a sink or approach each other so as to remove the sharpening stand from the sink; and/or the sharpener further includes a third movable plate and a fourth movable plate, where the third movable plate and the fourth movable plate are respectively connected to the sharpening stand, and the two movable plates can move relative to the sharpening stand to approach each other to fix the sharpening stone or separate from each other to remove the sharpening stone.

Compared with the existing technology, the beneficial effects of the embodiment of the present disclosure are as following:

the tool clamping assembly of the present disclosure ensures that a clamping point the tool is centered when the tool is clamped on two sides, compared with traditional clamping assemblies for clamping the tool, the tool clamping assembly of the present disclosure eliminates a frequent use of an internal hexagonal wrench when disassembling the tool, and the top pin is used to move so as to control the clamping arm to clamp or remove the tool, greatly reducing the clamping and disassembly time of the tool.

It should be understood that the above general description and the below detailed description below are only illustrative and not intended to limit the present disclosure.

The various implementations or examples of the technology described in the present disclosure is not a comprehensive disclosure of the entire scope or all features of the disclosed technology.

BRIEF DESCRIPTION OF DRAWINGS

In drawings that are not necessarily drawn to scale, the same reference numerals can describe similar components in different drawings. The accompanying drawings generally illustrate various embodiments by way of example rather than limitation, and are used together with the specification and claims to explain the embodiments of the present disclosure. At an appropriate condition, the same reference numerals are used in all drawings to refer to the same or similar parts.

Figure 1:
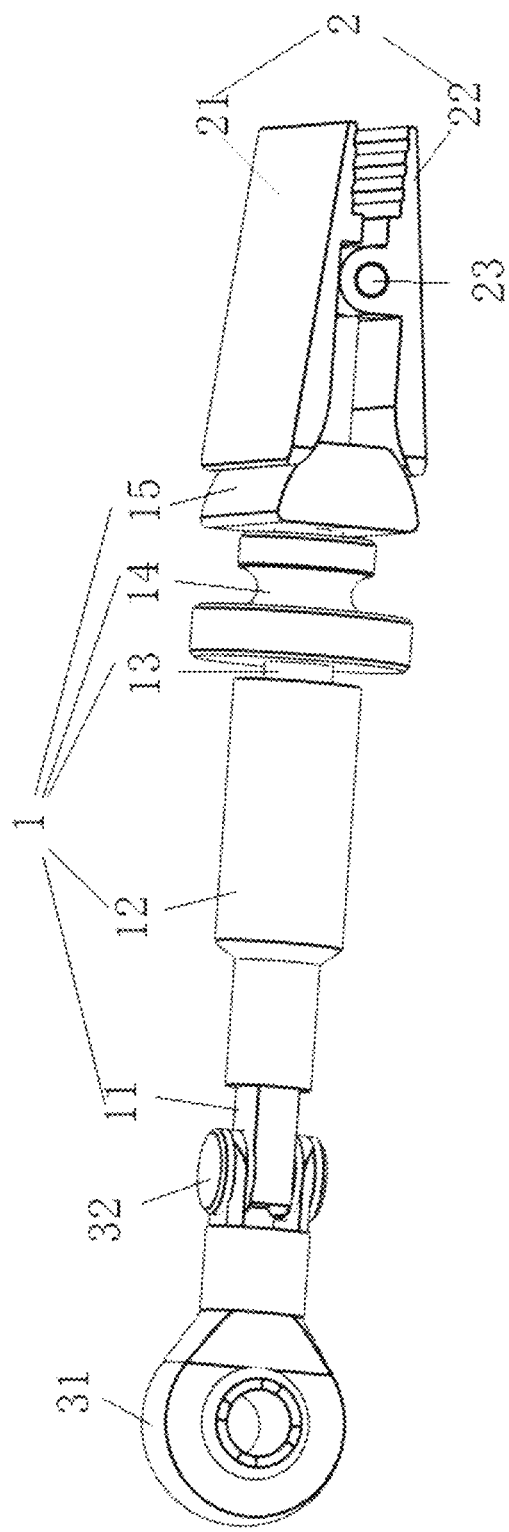
FIG. 1 is a schematic diagram of a three-dimensional structure of a tool clamping assembly in an embodiment of the present disclosure.

Numeral reference: 1—arm body; 11—first arm body; 12—rotating sleeve; 13—second arm body; 14—driving member; 15—top pin; 151—first side wall surface; 152—second side wall surface; 153—front wall surface; 154—rear wall surface; 2—clamping arm component; 21—first clamping arm; 22—second clamping arm; 23—rotation axis; 3—rotating joint; 31—first joint; 32—second joint; 4—sharpening stand; 41—first movable plate; 410—support portion; 42—second movable plate; 43—third movable plate; 44—fourth movable plate; 45—second limiting member; 46—sliding groove; 47—smooth rod; 48—screw; 49—nut; 5—sharpening frame; 51—first side bracket; 52—second side bracket; 53—crossbar; 54—tightening screw; 55—pin shaft; 56 arc-shaped guide groove; 57—spherical groove; 6—sliding seat; 61—pin hole; 62—screw holes; 63—adjustment bolt; 64—positioning button; 65—bearing roller; 66—open groove; 67—first limiting member.

DESCRIPTION OF EMBODIMENTS

In order to render the purpose, technical solution, and advantages of the present embodiment of the present disclosure clearer, the following will provide a clear and complete description of the technical solution of the embodiment of the present disclosure in combination with the accompanying drawings. Obviously, the described embodiments are a part of the embodiments of the present disclosure, rather than the entire embodiments. Based on the described embodiments of the present disclosure, all other embodiments obtained by those skilled in the art without the need for creative work are within the protection scope of the present disclosure.

Unless otherwise defined, the technical or scientific terms used in the present disclosure shall have the usual meanings understood by persons with general skills in the field to which the present disclosure belongs. Terms "first", "second" and similar words used in the present disclosure do not indicate any order, quantity or importance, but are only used to distinguish different components. Words such as "including" or "comprising" refer to the elements or objects that appear before the word, including those listed after the word and their equivalents, without excluding other elements or objects. Words like "connection to" or "connection with" are not limited to physical or mechanical connections, but can include electrical connections, whether direct or indirect. Up, down, left, right, etc. are only used to represent relative positional relationships. When the absolute position of the described object changes, the relative positional relationship may also change accordingly.

In order to maintain clarity and conciseness in the following description of the embodiments of the present disclosure, detailed explanations of known functions and known components have been omitted.

An embodiment provides a tool clamping assembly for use on a sharpener. The sharpener is provided with a sharpening frame 5, and the tool clamping assembly is connected to the sharpening frame 5. The tool clamping assembly is used to clamp the tool, and a grinding of the tool by a sharpening stone is achieved through a movement of the sharpening frame 5.

As shown in FIG. 1, the tool clamping assembly mainly includes an arm body 1 and a clamping arm component 2.

A first end of the arm body 1 is used to connect with the sharpening frame 5. The arm body 1 is provided with a top pin 15 and a driving member 14, the driving member 14 is used to drive the top pin 15 to move back and forth along an axial direction of the arm body 1.

The clamping arm component 2 includes a first clamping arm 21 and a second clamping arm 22, which are mirror symmetric. The first clamping arm 21 and the second clamping arm 22 are connected by a rotation axis 23, the rotation axis 23 is connected to a second end of the arm body 1, a torque member is provided on the rotation axis 23, which is used to apply torque to the two clamping arms so that a first end of the first clamping arm 21 and a first end of the second clamping arm 22 jointly clamp the top pin 15. That is, in a natural state, the clamping arm component 2 clamps the top pin 15. The torque member is a torsion spring or an elastic sheet.

When the top pin 15 is moved, the first clamping arm 21 and the second clamping arm 22 can rotate synchronously, so that a second end of the first clamping arm 21 and a second end of the second clamping arm 22 are closed to each other to clamp the tool or separate from each other to release the tool.

As shown in FIG. 1, when the top pin 15 is moved in a direction close to the rotation axis 23, a second end of the first clamping arm 21 and a second end of the second clamping arm 22 are closed to each other to clamp the tool; when the top pin 15 is moved away from the rotation axis 23, the second end of the first clamping arm 21 and the second end of the second clamping arm 22 are separated from each other to release the tool.

The tool clamping assembly of this embodiment ensures that a tool clamping point is centered when the tool is clamped on two sides. Compared to traditional clamping assemblies, the tool clamping assembly of this embodiment eliminates a frequent use of an internal hexagonal wrench when disassembling the tool, and the top pin 15 is used to move so as to control the clamping arm to clamp or remove the tool, thereby greatly reducing the clamping and disassembly time of the tool.

Figure 2:
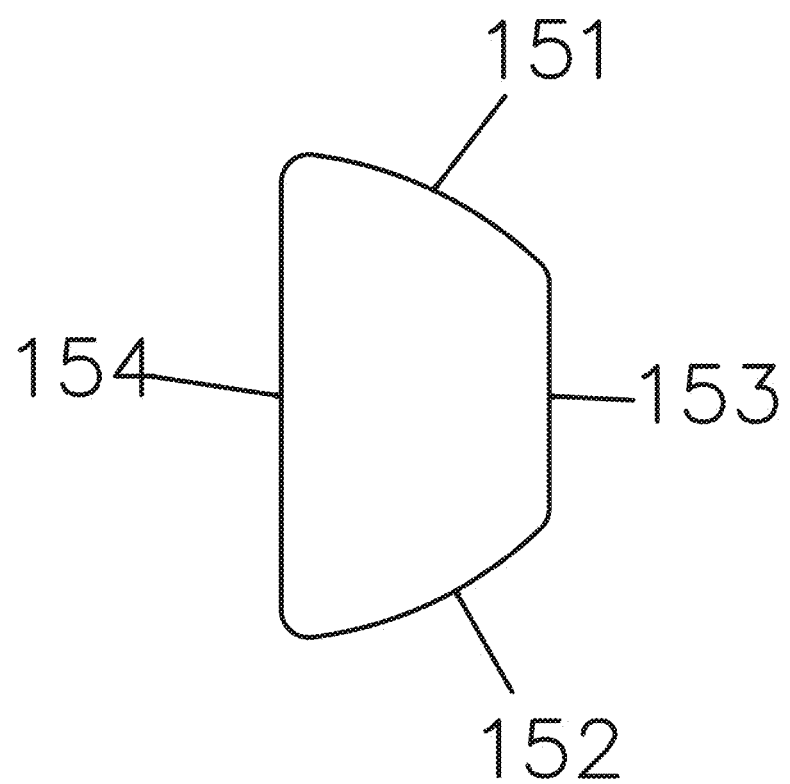
FIG. 2 is a front view of a top pin in an embodiment of the present disclosure.

As shown in FIG. 2, in some embodiments, a shape of the top pin 15 can be a trapezoidal block, and it can be sleeved on the arm body 1 and is slid along the axial direction of the arm body 1. A first side wall surface 151 and a second side wall surface 152 of the top pin 15 are mirror symmetric about a symmetry plane between the first clamping arm 21 and the second clamping arm 22.

The first side wall surface 151 of the top pin 15 abuts against a first end of the first clamping arm 21, and the second side wall surface 152 of the top pin 15 abuts against a first end of the second clamping arm 22. Due to a fact that the first side wall surface 151 and the second side wall surface 152 of the top pin 15 are both inclined surfaces, when the top pin 15 is rotated away from the rotation axis 23, first ends of the two clamping arms can slide along the corresponding inclined surfaces, rendering it convenient for the two clamping arms to rotate.

In an implementation mode, the first side wall surface 151 and the second side wall surface 152 of the top pin 15 in this embodiment are both arc-shaped surfaces, which facilitates the sliding of the first ends of the two clamping arms along the corresponding inclined surfaces.

The structure of the top pin 15 in this embodiment, combined with two symmetrically arranged clamping arms, can ensure that a centerline of the tool is automatically centered during a clamping process, without frequent adjustment of the clamping assembly.

As shown in FIG. 1, in some embodiments, the first clamping arm 21 and the second clamping arm 22 can each be a plate structure, which can increase a contact area between the two clamping arms and the tool, thereby ensuring the stability of clamping the tool.

As shown in FIG. 2, in some embodiments, a front wall surface 153 and a rear wall surface 154 of the top pin 15 may be flat, the front wall surface 153 directly abuts against the top pin 15 and the rear wall surface 154 is directly connected to the driving member 14.

As shown in FIG. 1, in some embodiments, the driving member 14 may be a driving nut, which is located on one side of the top pin 15 away from the rotation axis 23 and abuts against the rear wall surface 154 of the top pin 15. The driving nut 49 is threaded with the arm body 1, and the top pin 15 can be sleeved on the arm body 1 and is clearance-fit with the arm body 1. By rotating the driving nut 49, the top pin 15 can be driven to be close to the rotation axis 23, thereby enabling the two clamping arms to clamp the tool.

For example, by rotating the driving nut 49 clockwise, the top pin 15 can be pushed forward, thereby pushing the second ends of the two clamping arms to close each other so as to clamp the tool. When the driving nut 49 is rotated counterclockwise, the top pin 15 is moved backward under a force between two inclined side walls of the top pin 15 and the two clamping arms, causing the second ends of the two clamping arms to separate and release the tool.

By rotating the driving nut 49 to push the top pin 15 to move, it can save effort and ensure that even a girl can easily clamp the tool, thereby expanding the user scope. And due to a self-locking effect between the driving nut 49 and the arm body 1, it can also ensure the stability of the two clamping arms clamping the tool, ensuring that the tool does not fall off or harm hands.

Of course, in other embodiments, the driving member 14 can adopt other structural forms. For example, the driving member 14 can be a telescopic driving member, which is fixed on the arm body 1. A telescopic end of the driving member 14 is connected to the top pin 15, and the top pin 15 is controlled to move along the axial direction of the arm body 1 through a telescopic motion of the driving member 14.

As shown in FIG. 1, in some embodiments, the arm body 1 may include at least three parts: a first arm body 11, a second arm body 13, and a rotating sleeve 12.

Where, the rotating sleeve 12 is located between the first arm body 11 and the second arm body 13. A first end of the first arm body 11 forms a first end of the entire arm body 1 for connection with the sharpening frame 5, and a first end of the second arm body 13 forms a second end of the entire arm body 1 for connection with the top pin 15.

The rotating sleeve 12 is fixedly connected to the second end of one of the two arm bodies 1, and is threaded to the second end of the other arm body 1. The top pin 15 and the driving member 14 are respectively located on the second arm body 13. In this way, when one cutting surface of the tool is ground and the other cutting surface needs to be ground, the tool can be flipped by rotating the arm body 1 or the rotating sleeve 12. This ensures that angles of two surfaces of the tool remain consistent during a grinding process, without disassembling the tool, thereby saving time and effort.

The rotating sleeve 12 being fixedly connected to the second end of one of the two arm bodies 1, and threaded with the second end of the other arm body 1 may include: the rotating sleeve 12 is fixedly connected to the second end of the first arm body 11, and threaded connection with the second end of the second arm body 13, which can be controlled by rotating the second arm body 13 so as to control a flipping of the clamping arm component 2 and achieves a flipping of a tool surface.

In an implementation mode, the rotating sleeve 12 can be threaded to the second end of the first arm body 11 and fixedly connected to the second end of the second arm body 13. By rotating the rotating sleeve 12, the flipping of the clamping arm component 2 can be controlled, thereby achieving the flipping of the tool surface.

As shown in FIG. 1, in some embodiments, the tool clamping assembly may further include a rotating joint 3, which is connected to the first end of the arm body 1 and the sharpening frame 5. The rotating joint 3 is used to swing the arm body 1 relative to the sharpening frame 5, thereby adjusting a position of the tool relative to the sharpening stone.

Where, the rotating joint 3 may include a first joint 31 and/or a second joint 32. Where, the first joint 31 can be used to control the arm body 1 to swing up and down relative to the sharpening frame 5, and the first joint 31 can be a bearing structure, etc. The second joint 32 can be used to control the swing of the arm body 1 relative to the sharpening frame 5, and can be a hinge structure, etc.

As shown in FIG. 1, when the rotating joint 3 includes the first joint 31 and the second joint 32, the first joint 31 can be directly connected to the sharpening frame 5, and the second joint 32 is connected to the first joint 31 and the first end of the arm body 1. Through a cooperation of the first joint 31 and the second joint 32, the arm body 1 can achieve both up and down swinging of the sharpening frame 5 and left and right swinging of the sharpening frame 5. The first joint 31 and the second joint 32 together form a four-axis motion of up, down, left and right, ensuring that large angle left-and-right swinging is required during the grinding process, thereby ensuring that tools with different lengths can be ground on the grinding stone and achieving adaptive grinding of various blade shapes.

As shown in FIGS. 3 to 6, the embodiment of the present disclosure further provides a sharpening tool, and the sharpening tool mainly includes a sharpening stand 4, a sharpening frame 5, and the tool clamping assembly as described in any of the above embodiments.

The sharpening stand 4 can be used to fix one sharpening stone (not shown in the drawing), and the sharpening stone can be detachably connected to the sharpening stand 4, rendering it easy to replace the sharpening stone.

The sharpening frame 5 is provided on the sharpening stand 4, and the sharpening frame 5 can be moved relative to the sharpening stand 4.

The first end of the arm body 1 in the tool clamping assembly is connected to the sharpening frame 5 and can be moved with the sharpening frame 5, thereby grinding the tool clamped by the clamping arm component 2 through the grinding stone.

This sharpener can ensure that angles of two surfaces of the tool remain consistent during a grinding process, without a need to change surfaces, saving time and effort in gripping the tool.

In some embodiments, a first guide member is provided on one side of the sharpening stand 4 that is facing away from the side fixed with the sharpening stone.

The sharpener further includes a sliding seat 6, which is provided with a second guide member. The first guide member and the second guide member can cooperate with each other to allow the sliding seat 6 to slide relative to the sharpening stand 4. Where, the sharpening frame 5 is connected to the sliding seat 6 and can slide with the sliding seat 6.

Figure 3:
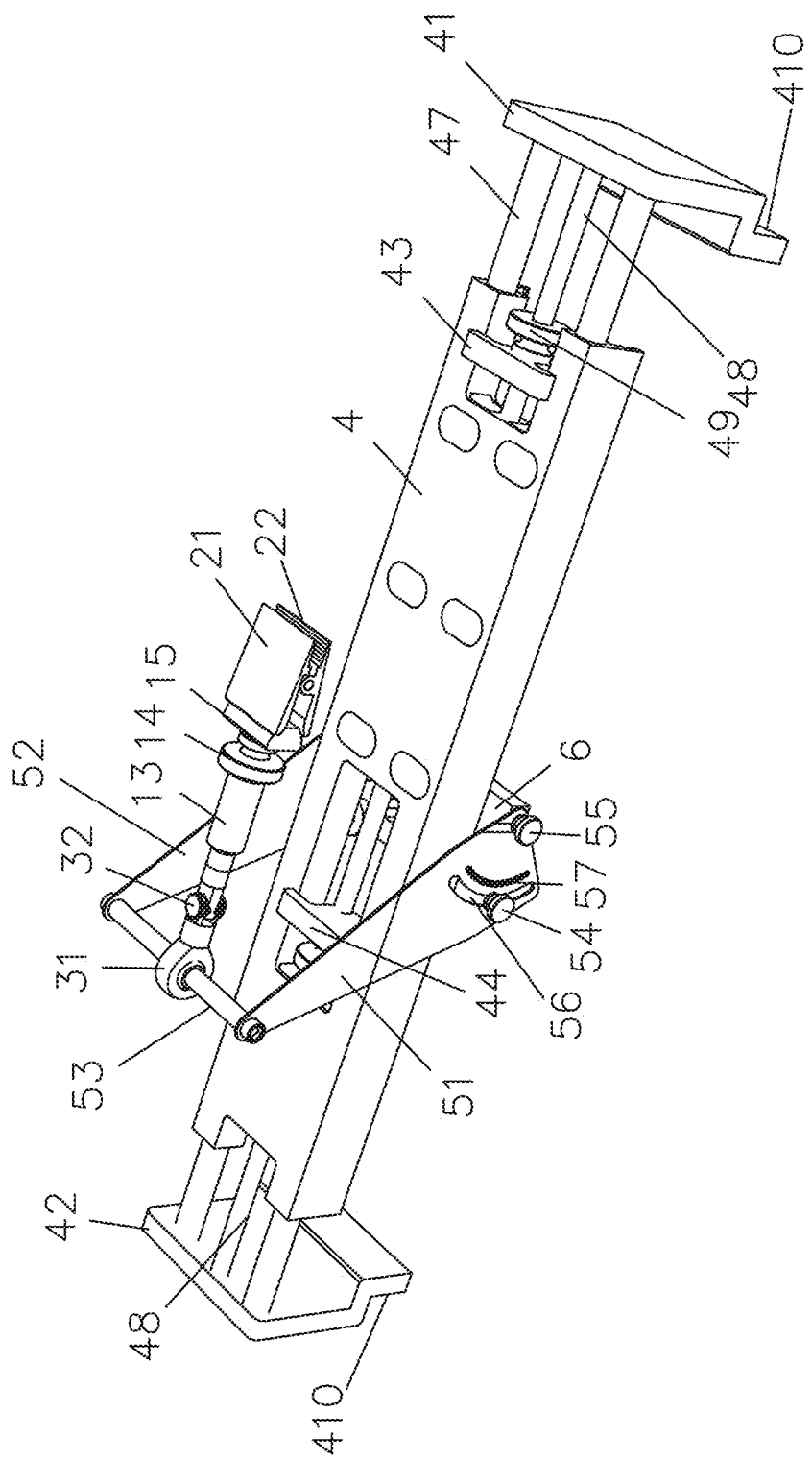
FIG. 3 is a schematic diagram of a three-dimensional structure of a sharpener from a first perspective according to an embodiment of the present disclosure.
Figure 4:
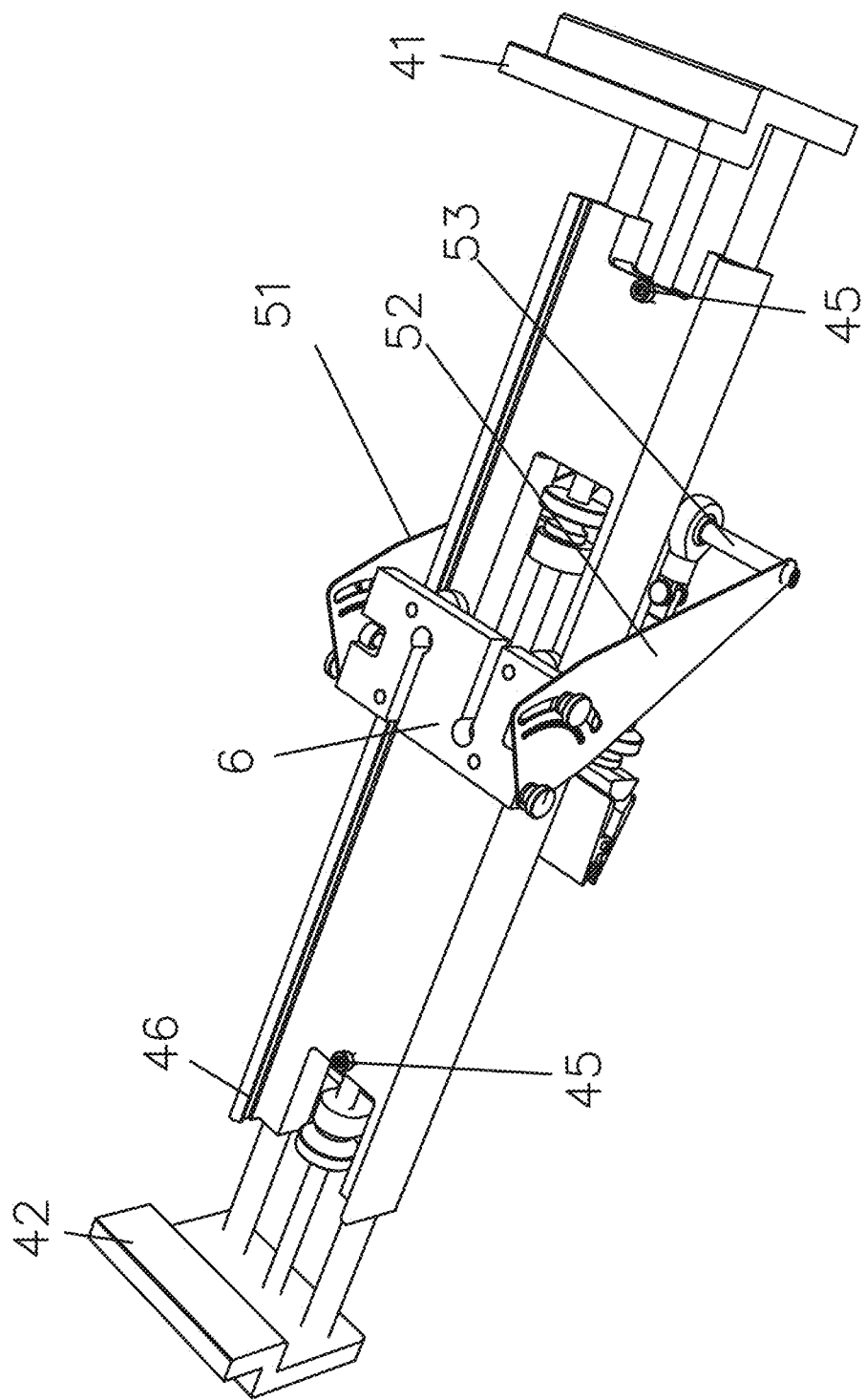
FIG. 4 is a schematic diagram of a three-dimensional structure of the sharpener from a second perspective according to an embodiment of the present disclosure.

As shown in FIGS. 3 and 4, in this embodiment, the sharpening stone being fixed on an upper surface of the sharpening stone can be taken as an example, the first guide member is provided on a lower surface of the sharpening stone, and the two guide members are cooperated at a bottom of the sharpening stone to avoid mud or iron filings generated during the grounding process from falling onto the two guide members, thereby affecting the sliding of the sliding seat 6.

In some embodiments, the first guide member may be sliding grooves 46 on two opposite sides of a bottom of the sharpening stand 4, with slots of the sliding grooves 46 on two sides facing each other. Extension directions of the sliding grooves 46 are consistent with a movement direction of the sliding seat 6.

Figure 8:
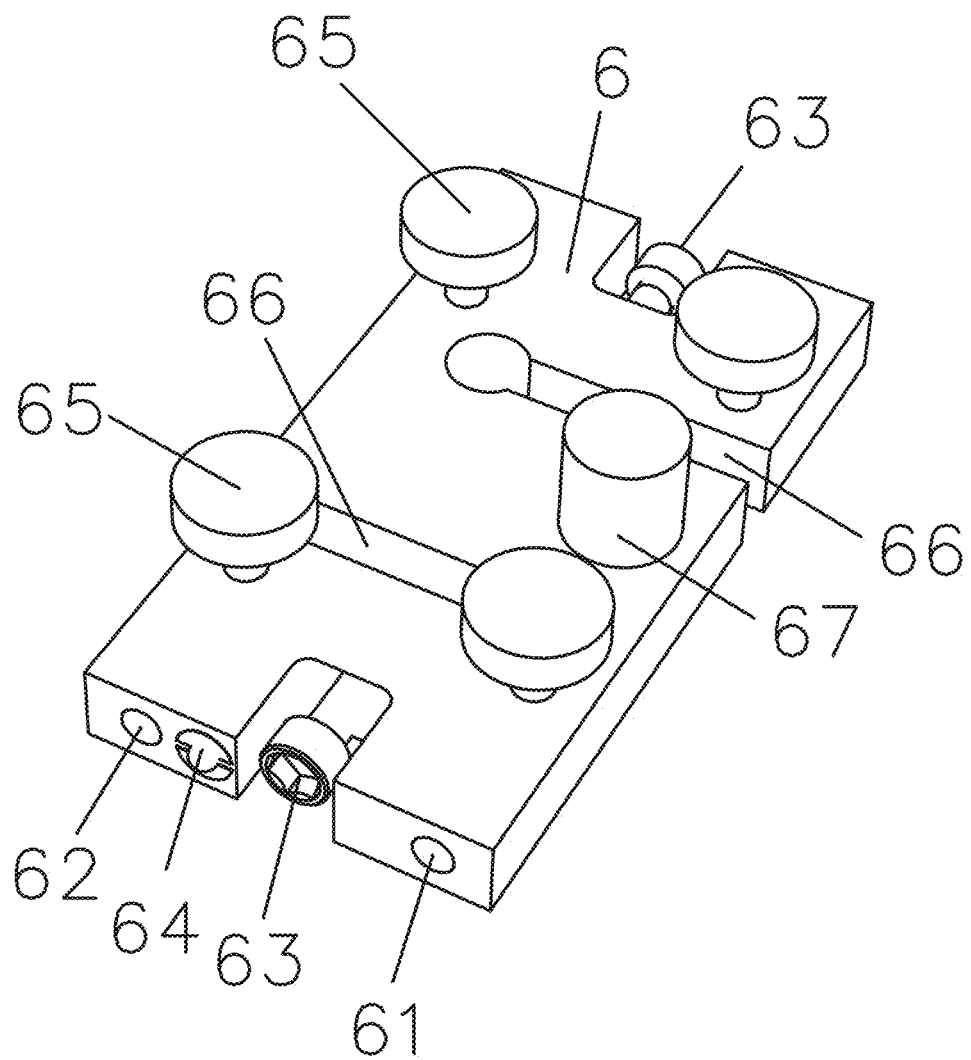
FIG. 8 is a schematic diagram of a three-dimensional structure of a sliding seat in an embodiment of the present disclosure.

As shown in FIG. 8, the second guide member can be a bearing roller 65 provided on the sliding seat 6. Two sliding grooves 46 on two sides of the sharpening stand 4 correspond to two bearing rollers 65, and the bearing rollers 65 are embedded in the sliding grooves 46. Through a cooperation of the bearing rollers and the sliding grooves 46, a high-precision and low friction sliding of the sliding seat 6 can be achieved, and it is quiet and has a long service life.

As shown in FIG. 8, in some embodiments, the sliding seat 6 may be provided with an open groove 66 on one sides of two sets of bearing rollers 65, and extension directions of the two open grooves 66 are consistent with the sliding directions. In an implementation mode, an adjustment bolt 63 is provided on two sides of the sliding seat 6 along its movement direction. Two adjustment bolts 63 are respectively embedded into an interior of the sliding seat 6 and are respectively extended into the open grooves 66. The ends of the two adjustment bolts 63 abut against side walls of the two open grooves 66. By rotating the two adjustment bolts 63, widths of the open grooves 66 can be fine-tuned, and a distance between the two sets of bearing rollers 65 can be adjusted, so that the bearing rollers 65 can be tightly adhered to groove walls of the open grooves 66, thereby ensuring the stability of the sliding of the bearing rollers 65.

As shown in FIG. 8, in some embodiments, a first limiting member 67 can further be provided on the sliding seat 6, and the bottom of the sharpening stand 4 is provided with a second limiting member 45 at two ends of the sliding seat 6 in the movement direction. When the sliding seat 6 is moved close to two ends of the sharpening stand 4, the first limiting member 67 can contact the second limiting member 45, thereby avoiding the bearing roller 65 on the sliding seat 6 from slipping out of the sliding groove 46 of the sharpening stand 4.

Of course, in other embodiments, the first guide member and the second guide member may adopt structural forms to achieve a high-precision and low friction sliding fit. For example, the first guide member can be a smooth rod, and the second guide member can be a ball bearing; or, the first guide member can be the ball bearing, and the second guide component can be the smooth rod.

Figure 5:
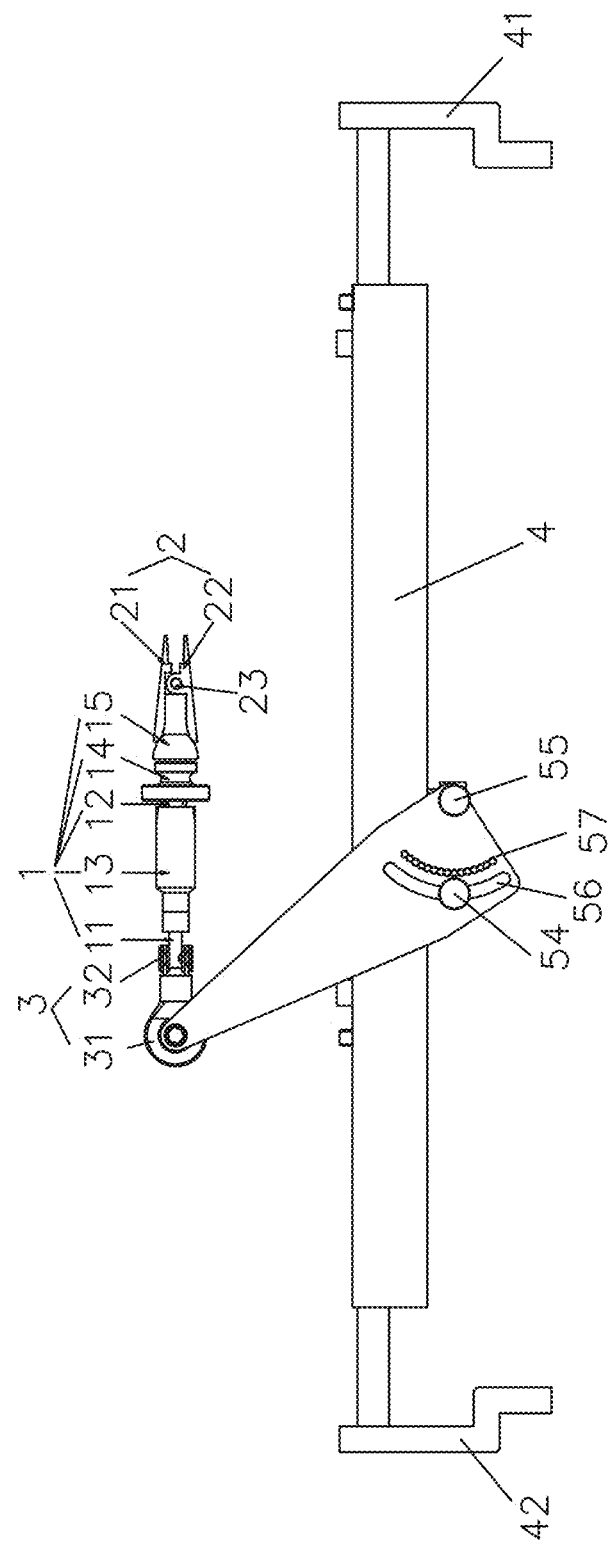
FIG. 5 is a front view of the sharpener according to an embodiment of the present disclosure.
Figure 6:
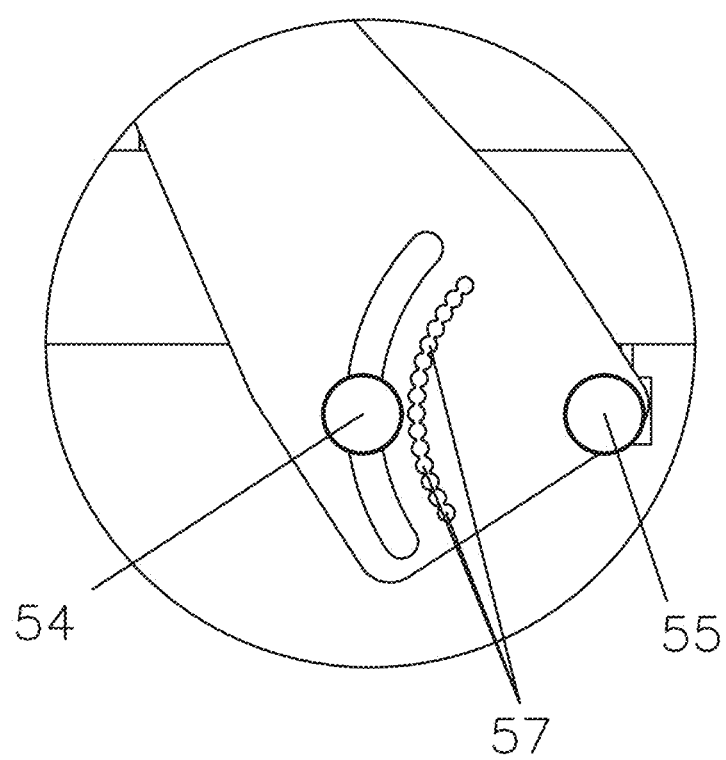
FIG. 6 is a top view of the sharpener according to an embodiment of the present disclosure.
Figure 7:
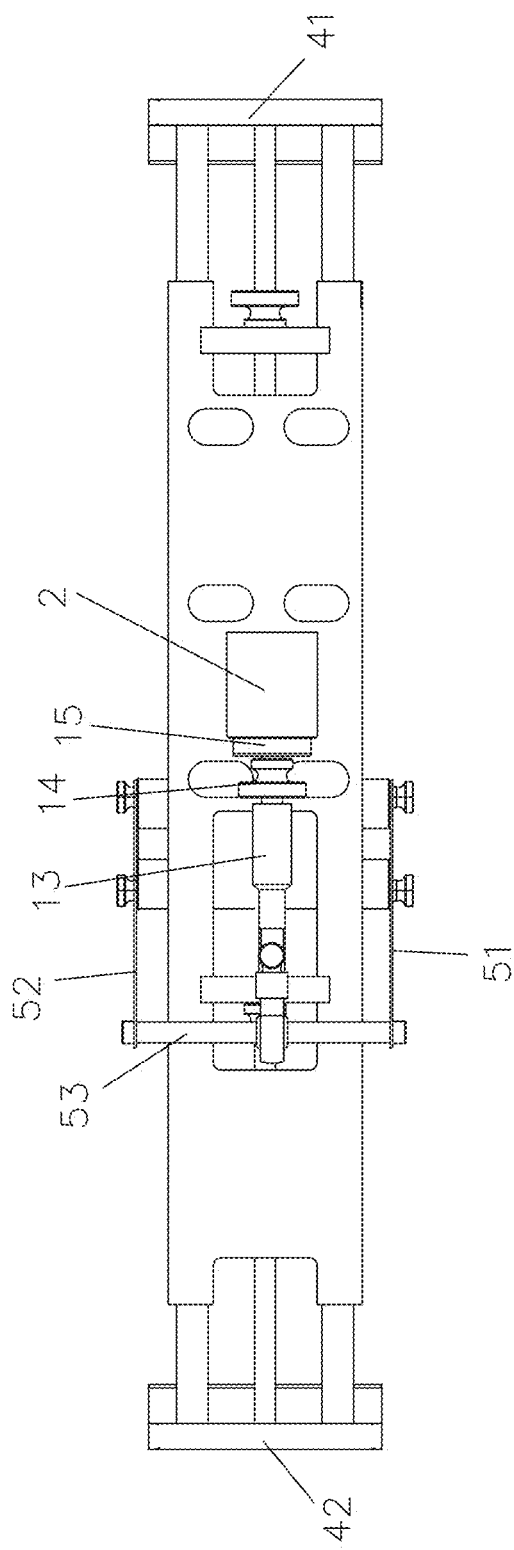
FIG. 7 is an enlarged view of an arc-shaped guide groove in an embodiment of the present disclosure.

As shown in FIGS. 3 and 5, in some embodiments, the sharpening frame 5 includes a first side bracket 51 and a second side bracket and 52 arranged at intervals, as well as a crossbar 53 connecting the first side bracket 51 and second the second side bracket 52. The crossbar 53 is located above the sharpening stand 4, and the sharpening stone is below the crossbar 53. The first end of the arm body 1 is connected to the crossbar 53, so that a user can hold the tool with both hands and slide it back and forth on the sharpening stone to achieve griding. The structure of the sharpening frame 5 is simple and does not hinder the user from holding the tool.

The first side bracket 51 is located on a first side of the sharpening stand 4, and the second side bracket 52 is located on a second side of the sharpening stand 4. The first side bracket 51 and the first side bracket 51 are respectively rotatably connected to the sharpening stand 4. The two side brackets can rotate simultaneously to achieve a rotation of the sharpening frame 5 relative to the sharpening stand 4, thereby adjusting an angle between a cutting edge of the tool and the sharpening stone to better achieve the grinding.

As shown in FIGS. 3 and 8, in some embodiments, coaxial pin holes can be respectively provided on the sliding seat 6 and the two side brackets. The side brackets can be rotatably connected to the sliding seat 6 through the pin shaft 55 respectively passing through the pin hole on the sliding seat 6 and the pin holes on the side brackets.

In an implementation mode, a fastening mechanism is provided between the first side bracket 51 and the first side bracket 51, respectively with the sharpening stand 4. The fastening mechanism is used to fix the sharpening frame 5. When the user rotates the two side brackets to adjust an angle between the tool and the sharpening stone, the sharpening frame 5 and the sliding seat 6 can be fixed together through the fastening mechanism, thereby ensuring that the user does not rotate the sharpening frame 5 and maintaining the stability of a grinding angle during movement.

As shown in FIGS. 3 and 8, in some embodiments, the fastening mechanism configured to fix the sharpening frame 5 and the sliding seat together mainly includes an arc-shaped guide groove 56, a screw hole 62, and tightening screws 54.

Where the first side bracket 51 and the second side wall bracket are respectively provided with the arc-shaped guide groove 56 that passes through their opposite sides. An extension direction of the arc-shaped guide groove 56 is consistent with a rotation direction of the two side brackets.

The screw hole 62 is provided on the sliding seat 6 and is opposite to the arc-shaped guide groove 56. The tightening screws 54 are respectively penetrated into the arc-shaped guide groove 56 and the screw hole 62. By rotating the tightening screws 54, the two side brackets can be tightly adhered to the sliding seat 6, thereby fixing the sharpening frame 5.

In an implementation mode, the tightening screw 54 of this embodiment can be selected as a sheep angle screw, which can achieve torque locking without a need for an external tool such as a wrench. Under this structural component, it ensures that the sharpening frame can adjust the angle in 51 seconds, lock in 2 seconds, and not shake during grinding, achieving simpler, more efficient, and more convenient angle adjustment, thereby ensuring an effectiveness of grinding the tool.

Of course, in other embodiments, the arc-shaped guide groove 56 can also be provided on the sliding seat 6, and correspondingly, the screw holes 62 are provided on the two side brackets. By tightening the screws 54, they are respectively penetrated into the arc-shaped guide groove 56 and the screw holes 62, and the sharpening stand 4 can also be fixed.

In some embodiments, an angle positioning mechanism may also be provided between the sharpening frame 5 and the sliding seat 6, as shown in FIGS. 3 and 8. The angle positioning mechanism may include a positioning slot provided on two side brackets and a positioning button 64 provided on the sliding seat 6. Where the positioning button 64 is located at two ends of the sliding seat 6 in the movement direction.

Where, the positioning slot is also arc-shaped and extended in the same direction as the rotation direction of the two side brackets. The positioning slot is composed of a plurality of spherical grooves 57 arranged in sequence and communicated to each other. The positioning button 64 is provided on the sliding seat 6 and can move up and down relative to the sliding seat 6. The positioning button 64 is always embedded in the spherical groove 57 of the positioning slot. When the sharpening frame 5 is rotated to a certain angle, the positioning button 64 will be embedded in the corresponding spherical groove 57 at that angle, thus achieving a preliminary positioning of the sharpening frame 5. Then, the sharpening frame 5 and the sliding seat 6 are fastened together through the fastening mechanism.

It should be noted that due to a fact that the positioning button 64 can be slid up and down relative to the sliding seat 6, when the sharpening frame 5 or the two side brackets is/are rotated, they will continuously press the positioning button 64, thereby adjusting its position between the plurality of spherical grooves 57.

As shown in FIGS. 3 to 6, in some embodiments, the sharpener further includes a first movable plate 41 and a second movable plate 42. The first movable plate 41 is located on a first side of the sharpening stand 4, and the second movable plate 42 is located on a second side of the sharpening frame 5. Where, the first side and the second side of the sharpening stand 4 are opposite.

The first movable plate 41 and the second movable plate 42 are respectively connected to the sharpening stand 4, and the two movable plates can move relative to the sharpening stand 4 to approach or separate from each other, thereby fixing the sharpening stand 4 on a sink or remove it from the sink.

In an implementation mode, the above includes two situations, one is that the two movable plates can move relative to the sharpening stand 4 to separate from each other, thereby fixing the sharpening stand 4 on the sink. For example, when the two movable plates are separated from each other, they can be respectively attached to a groove wall of the sink, so that the entire sharpening stand 4 can be fixed above the sink. In this way, grinding can be carried out above the sink with flowing water to wash away dust generated in the first time. The grinding stone abrasive is made of natural ingredients and will not pollute the environment. Flushing grinding can quickly wash away mud and iron filings, ensuring the sharpness of the grinding angle and even serrations of the blade tip, which can achieve better results. When it is necessary to remove the sharpening stand 4 from the sink, the two movable plates can be controlled to approach each other, so that a distance between the two movable plates is reduced, and the two movable plates are no longer in contact with the groove wall of the sink, rendering it easy to remove the sharpening stand 4 from the sink.

In an implementation mode, the other is that the two movable plates can move relative to the sharpening stand 4 and approach each other, thereby fixing the sharpening stand 4 to the sink. For example, when two movable plates are close to each other, they can be respectively attached to an outer wall of the sink, that is, the entire sharpening stand 4 can be clamped on the sink through the two movable plates, so that the entire sharpening stand 4 can be fixed above the sink. When it is necessary to remove the sharpening stand 4 from the sink, the two movable plates can be controlled to separate from each other, so that the distance between the two movable plates is greater than a diameter of a groove mouth of the sink, and the two movable plates are no longer in contact with the outer wall of the sink, thereby achieving the separation of the sharpening stand 4 from the sink.

The structure of the sharpener in this embodiment can adapt to sinks of different sizes and can be used in different household environments, with a wider range of adaptability and achieving a more effective, clean and tidy effect.

This embodiment adopts a scalable solution to adapt to sinks of different sizes, which can be used in different household environments. It has a wider range of adaptability and achieves a more effective, clean and tidy effect.

In some embodiments, the first movable plate 41 and the second movable plate 42 are respectively connected to the sharpening stand 4 through the smooth rod 47, a length direction of the smooth rod 47 is consistent with the movement direction of the movable plate. Through the smooth rod 47, the stability of the sliding of the first movable plate 41 and the second movable plate 42 can be ensured. As for a telescopic driving way of the first movable plate 41 and the second movable plate 42, there is no specific limitation. It can be achieved through the structure of the screw 48 and the nut 49, or by using the telescopic structure of the telescopic driving member 14.

As shown in FIGS. 3 to 6, in some embodiments, the sharpener may further include a third movable plate 43 and a fourth movable plate 44.

The third movable plate 43 and the fourth movable plate 44 are respectively connected to the sharpening stand 4, and the two movable plates can move relative to the sharpening stand 4 to approach each other to fix the sharpening stone or separated from each other to remove the sharpening stone. The clamping and releasing of the sharpening stone can be achieved through the third movable plate 43 and the fourth movable plate 44. As shown in FIG. 3, a support portion 410 can be respectively provided on the third movable plate 43 and the fourth movable plate 44, so that the sharpening stand 4 can be clamped at a top of the sink.

In some embodiments, a shape of the sharpening stand 4 may be elongated, and the first movable plate 41 and the second movable plate 42 may be located at two ends of the sharpening stand 4 in a length direction. The first movable plate 41 and the second movable plate 42 can be respectively connected to two ends of the sharpening stand 4 in the length direction.

In an implementation mode, the third movable plate 43 and the fourth movable plate 44 are located between the first movable plate 41 and the second movable plate 42, respectively. The sharpening stand 4 is provided with an avoidance groove for placing the third movable plate 43 and the fourth movable plate 44, a screw 48 passing through the avoidance groove, and a nut 49 threaded with the screw 48.

Where, the third movable plate 43 and the fourth movable plate 44 can be clamped in the avoidance groove and sleeved on the screw 48. The third movable plate 43 is located on one side of the nut 49 away from the first movable plate 41, and the fourth movable plate 44 is located on one side of the nut 49 away from the second movable plate 42. One end of the nut 49 is connected to the first movable plate 41 and the second movable plate 42 respectively. When the first movable plate 41 and the second movable plate 42 are moved, the nut 49 is driven to move forward and backward. By rotating the nut 49, the third movable plate 43 and the fourth movable plate 44 can be pushed to be close to each other, thereby adjusting a gap between the two.

In addition, specific mechanisms of the first movable plate 41, the second movable plate 42, the third movable plate 43, and the fourth movable plate 44 in this embodiment are not limited.

The above description is intended to be illustrative rather than restrictive, and those skilled in the art may make changes, modifications, substitutions, and variations to the above embodiments within the scope of the present disclosure. Besides that, the above examples (or one or more schemes) can be combined with each other, and it is considered that these embodiments can be combined with each other in various combinations or arrangements.

What is claimed is:

1. A tool clamping assembly used for a sharpener, wherein the sharpener is provided with a sharpening frame, and the tool clamping assembly comprises:
    an arm body, a first end of the arm body is connected with the sharpening frame, and the arm body is provided with a top pin and a driving member, the driving member is configured to drive the top pin to move along an axial direction of the arm body, wherein the driving member is a driving nut;
    a clamping arm component, comprising a first clamping arm and a second clamping arm,
        the first clamping arm and the second clamping arm are mirror symmetric and are connected by a rotation axis, the rotation axis is connected to a second end of the arm body,
        wherein torque is applied to the two clamping arms such that the two clamping arms are configured to jointly clamp the top pin at a first end of the first clamping arm and a first end of the second clamping arm;
    when the top pin is moved, the first clamping arm and the second clamping arm are rotated synchronously, so that a second end of the first clamping arm and a second end of the second clamping arm are closed to each other to clamp the tool or separate from each other to release the tool;
    wherein the arm body comprises a first arm body, a second arm body, and a rotating sleeve;
    a first end of the first arm body is connected with the sharpening frame, a first end of the second arm body is connected to the top pin, and the rotating sleeve is fixedly connected to the second end of one of the two arm bodies and threaded to the second end of the other arm body;
    the top pin and the driving nut are respectively located on the second arm body.

2. The tool clamping assembly according to claim 1, wherein a shape of the top pin is a trapezoidal block, and a first side wall surface and a second side wall surface of the top pin are mirror symmetric about a symmetry plane between the first clamping arm and the second clamping arm;

the first side wall surface of the top pin abuts against the first end of the first clamping arm, and the second side wall surface of the top pin abuts against the first end of the second clamping arm.

3. The tool clamping assembly according to claim 2, wherein the driving nut is located on one side of the top pin away from the rotation axis and abuts against the top pin;

the driving nut is threaded with the arm body, and the driving nut is capable of being rotated relative to the arm body to drive the top pin to be close to the rotation axis.

4. The tool clamping assembly according to claim 1, further comprising a rotating joint, wherein the rotating joint is connected to the first end of the arm body and the sharpening frame, and the rotating joint causes the arm body to swing relative to the sharpening frame.

5. A sharpener, comprising:

the tool clamping assembly according to claim 1;

a sharpening stand, configured to fix a sharpening stone;

the sharpening frame, provided on the sharpening stand, wherein the sharpening frame is capable of moving relative to the sharpening stand; and wherein the tool clamping assembly is connected to the sharpening frame and capable of moving with the sharpening frame to grind the tool through the sharpening stone.

6. The sharpener according to claim 5, wherein a first guide member is provided on a first side of the sharpening stand facing away from the sharpening stone;

the sharpener further comprises a sliding seat, wherein a second guide member is provided on the sliding seat, and the first guide member and the second guide member can cooperate with each other to enable the sliding seat to slide relative to the sharpening stand;

the sharpening frame is connected to the sliding seat and is capable of being slid with the sliding seat.

7. The sharpener according to claim 6, wherein the sharpener frame comprises a first side bracket and a second side bracket that are spaced apart, and a crossbar connecting the first side bracket and the second side bracket;

the crossbar is located above the sharpening stand, and the first end of the arm body is connected to the crossbar;

the first side bracket is located on the first side of the sharpening stand, and the second side bracket is located on a second side of the sharpening stand;

the first side bracket and the second side bracket are respectively rotatably connected to the sharpening stand;

a fastening mechanism is provided between the first side bracket and the second side bracket with the sharpening stand, the fastening mechanism is configured to fix the sharpening stand to limit its rotation.

8. The sharpener according to claim 7, wherein the fastening mechanism comprises:

an arc-shaped guide groove, which is provided on each of the first side bracket and/or the second side bracket;

an extension direction of the arc-shaped guide groove is consistent with a rotation direction of the first side bracket and the second side bracket;

a first screw hole provided on a first side of the sliding seat, and a second screw hole provided on a second side of the sliding seat opposite to the first side of the sliding seat, the first and second holes respectively provided opposite to the arc-shaped guide groove on each of the first side bracket and second side bracket;

tightening screws, which penetrate each respective first and second screw holes and respective arc-shaped guide groove, and the tightening screws are rotated to fix the sharpening stand.

9. The sharpener according to claim 5, further comprising:

a first movable plate and a second movable plate, wherein the first movable plate and the second movable plate are respectively connected to the sharpening stand, and the first and second movable plates are capable of moving relative to the sharpening stand to separate from each other and fix the sharpening stand on a sink or approach each other so as to remove the sharpening stand from the sink;

and/or the sharpener further comprises a third movable plate and a fourth movable plate, wherein the third movable plate and the fourth movable plate are respectively connected to the sharpening stand, and the third and fourth movable plates can move relative to the sharpening stand to approach each other to fix the sharpening stone or separate from each other to remove the sharpening stone.

* * * * *